United States Patent [19]

Littlefield

[11] 4,313,869
[45] Feb. 2, 1982

[54] COMPOSITION FRICTION ELEMENT FOR A RAILROAD BRAKE SHOE

[75] Inventor: John B. Littlefield, Wheaton, Ill.

[73] Assignee: AMSTED Industries Incorporated, Chicago, Ill.

[21] Appl. No.: 151,398

[22] Filed: May 19, 1980

[51] Int. Cl.³ .......................... C08K 3/22; C08L 61/10
[52] U.S. Cl. ........................................ 260/38; 260/2.3; 260/42.47; 260/42.48; 260/998.13; 260/42.49
[58] Field of Search .................. 260/DIG. 39, 38, 2.3, 260/998.13, 42.47, 42.48, 42.49

[56] References Cited

U.S. PATENT DOCUMENTS

| | | | |
|---|---|---|---|
| 3,673,276 | 6/1972 | Keller et al. | 260/DIG. 39 |
| 3,891,595 | 6/1975 | Birchall | 260/DIG. 39 |
| 3,959,194 | 5/1976 | Adelmann | 525/139 |
| 4,014,828 | 3/1977 | Thorpe | 260/38 |
| 4,014,850 | 3/1977 | Thorpe | 106/36 |
| 4,051,097 | 9/1977 | Aldrich | 260/DIG. 39 |
| 4,072,650 | 2/1978 | Littlefield | 260/DIG. 39 |
| 4,085,179 | 4/1978 | Hillhouse et al. | 260/29.7 NR |
| 4,111,891 | 9/1978 | Reynolds, Jr. | 260/DIG. 39 |
| 4,125,496 | 11/1978 | McGinnis | 260/DIG. 39 |

*Primary Examiner*—Allan Lieberman
*Attorney, Agent, or Firm*—John L. Schmitt; Fred P. Kostka; Edward J. Brosius

[57] ABSTRACT

A railroad brake shoe may include a friction element made by combining a number of materials so as to produce the required frictional characteristics for railroad braking. Heretofore, such friction elements commonly contained materials such as lead and asbestos. These two elements may have toxic characteristics under certain circumstances and therefore are suspect. To safely handle these suspect materials has thus become most difficult and expensive. By this invention, a composition friction element, which meets the requirements of the railroad industry, includes a substantially reduced suspect material content, yet is competitive in performance and cost with other known products.

3 Claims, No Drawings

COMPOSITION FRICTION ELEMENT FOR A RAILROAD BRAKE SHOE

BACKGROUND OF THE INVENTION

1. Field of the Invention

This invention relates to friction elements for railroad brake shoes and more particularly to a friction element formed by combining materials having characteristics which may be handled conveniently and safely without imposing a significant threat to human health and a safe environment.

2. Prior Art

A typical composition friction element usable in a railroad brake shoe is disclosed in U.S. Pat. No. 3,227,249, a joint invention of the inventor herein. The components of the element include an organic bond matrix, a mineral filler and cryolite, i.e. sodium-aluminum fluoride. The bond is made of synthetic rubber and resin which are curable under temperature and pressure. The hard mineral fillers suggested are cast iron turnings, white iron grit and calcined kyanite, i.e. aluminum silicate. Additional inorganic fillers such as litharge and lead powders are used to stiffen the bond and act as a lubricant while asbestos fiber is added to improve structural strength.

A further composition friction element is taught by U.S. Pat. No. 3,885,066. This element comprises 15-35% by weight of a resin binder, 45-65% by weight asbestos, and 3-10% by weight of one or more fillers. The fillers impart increased hardness and wear resistance to the brake shoe and function as friction modifiers. Fillers adding to the hardness of the composite include barytes, i.e. barium sulfate, alumina, i.e. aluminum oxide, zinc and limestone, i.e. calcium carbonate. Friction modifying fillers include brass powder, iron powder, carbon black, ground cork and aldehyde condensation products of cashew nut liquid.

A still further composite friction element is disclosed in U.S. Pat. No. 3,959,194 wherein the element is particularly formulated for use with relatively soft gunite iron railroad car wheels. The friction element is composed of 3-25% by weight of a rubber binder, 20-70% by weight of an inorganic filler and 2-12% by weight of fiber. The fiber component may be asbestos or a cellulose based material such as wood, sisal, jute and rayon fibers. The rubber binder may be made from a natural or synthetic rubber or other elastomeric material which is vulcanized or otherwise cured to form a hard material in which the other components are distributed. A phenolic resin at a concentration of 1-30% by weight is used as a strengthening or stiffening agent for the rubber matrix. Phenolic resins suggested include oil-modified two-stage powdered phenol formaldehyde resin and a liquid resin prepared from natural sources of phenol derivatives such as aldehyde reacted cashew nut shell oil. Hexamethylene-tetramine may be used as a curing agent. Graphite, cast iron, calcium carbonate, barytes and carbon black are suggested as inorganic fillers.

A most recent development in friction composites is disclosed in U.S. Pat. No. 4,137,214. This composite is particularly useful for automotive use. The composition is asbestos-free and includes a thermosetting resin and cashew particles. As a substitute for asbestos, fiberglas, mineral wool, silica fibers, carbon fibers, boron fibers, cotton, rayon, polyamide or polyester fibers as well as tungsten and steel fibers are suggested. Lastly, the friction composite includes powdered inorganic compounds such as zinc oxide and calcium carbonate each having a Moh's hardness rating greater than 2.0 and less than 5.0.

Other composite friction element developments are disclosed in U.S. Pat. No. 4,219,452. By the invention disclosed therein an aramid fiber was successfully substituted for asbestos.

Before a composite brake shoe can be sold for use by the United States railroad industry, it must satisfy certain minimum standards. These standards are met when a brake shoe successfully passes certain tests that have been established by the Association of American Railroads. Four such tests are used and include fire screen burn test, a series of drag tests, a series of stop tests and a static coefficient of friction test. In each case, the tested brake shoe selectively engages a railroad car wheel driven by a dynamometer. Although not a formal part of the AAR testing procedure, it is desireable that a composite friction element have low squeal characteristics, inhibit excessive metal pickup from the wheel tread, and be spark resistant.

SUMMARY OF THE INVENTION

The composite friction element of this invention which is usable as part of a railroad brake shoe comprises four categories or groupings of materials. Each such group of material provides certain functions which when combined produces the required end results, being a friction element which meets the AAR standards noted above. A particular material can produce multiple results. Such materials could, therefore, fit into more than one such grouping.

The first functional grouping of materials comprises a bond of the friction element. One primary ingredient of the bond is rubber. Examples of suitable rubbers are a butyl rubber, a styrene butadiene copolymer rubber, an acrylonitrile rubber, and a chlorinated butyl rubber. Such rubbers are vulcanizable with the aid of such curing agents as sulfur or 2-mercaptobenzothiazole, tetramethylthiuram disulfide. Other materials in the bond may include carbon black, magnesium oxide and zinc oxide which act as a reinforcing agent for stiffening the rubber and thus making such less elastomeric. Additionally, these other materials promote curing of the rubber.

A second primary ingredient in the bond is a thermosetting resin. One such resin is phenol-aldehyde resin which also adds strengthening and stiffening characteristics to the bond. The phenolic resin may be a synthetic resin made by combining organic compounds such as phenol and formaldehyde. Alternatively, this resin may be obtained from a natural source of a phenol derivative such as cashew nut shell oil partially reacted with an aldehyde to provide thermosetting properties. Blends of synthetic or natural resins or resins modified with oils also may be used.

Such resins may be self-curing so as to form cross linking bonds with the rubber under heat and pressure. Other resins require an independent curing agent such as hexamethylene-tetramine be present.

The purpose of the bond is to provide a bulk media in which the other ingredients first may be dispersed and then cured to form a fixed physical structure which maintains the dispersion. Below in Table I are the components of the bond and the proximate percentage by weight within the total friction composition.

TABLE I

| Bond Material Grouping | |
|---|---|
| Material | Proximate Percentage Range by Weight |
| Rubber | 5.0 to 20.0% |
| Sulfur | — to 0.25 to 10.0% |
| Uncured Resin | — to 23.0% |
| Hexa | — to 1.5% |
| Carbon Black | — to 8.0% |
| Magnesium Oxide | — to 4.0% |
| Zinc Oxide | — to 8.0% |

During a curing of the rubber and resin noted above, gases are produced. The amount of such gas so produced must be limited if the structural integrity of the friction element is to be maintained. Thus there is a finite limit on the amount of resin and rubber which may comprise a usable railroad composite friction element.

The second functional grouping of material comprises organic and carbon base fillers. These fillers provide several functions. One such function is to be an inexpensive bulk. Secondly, these fillers help to control friction at elevated operating temperatures. Such fillers break down at proximately 500° F. to form primarily gas and carbon. These products from this reactive breakdown serve as an interface between the friction element and the steel rim of the wheel to inhibit metal tear-out from the wheel and undue physical deterioration to the friction element. This interface moderates temperature and friction in a severe braking environment.

Note that the bond in its cured state also breaks down in a similar manner to supplement this interface. If it were not for cost and curing considerations, this function could be provided by the bond present in a higher concentration.

Examples of organic and carbon base fillers are cured cashew resin, neoprene scrap, natural and synthetic graphite, petroleum coke, and anthracite coal. Ground tire peels are also usable as a substitute for neoprene scrap. Below in Table II are the various materials which may form in part the organic and carbon base filler grouping and the proximate percentage by weight within the total composite.

TABLE II

| Organic or Carbon Base Filler Grouping | |
|---|---|
| Material | Proximate Percentage Range by Weight |
| Cured Resins | — to 12.0% |
| Neoprene Scrap | — to 15.0% |
| Graphite | — to 12.0% |
| Petroleum Coke | — to 9.0% |
| Anthracite Coal | — to 8.0% |

The third functional grouping of materials comprises inorganic fillers. This grouping is more multipurpose in nature. One purpose of such fillers is to supply the required frictional coefficient to the composite element. Another purpose is to furnish certain absorptive characteristics. Certain inorganic fillers can also act as coolants to supplement the bond and the organic fillers as discussed earlier. For the most part, inorganic fillers do not break down under heat and pressure experienced in railroad braking. Thus typically these fillers would produce physical damage to the wheel if not combined with other materials which modify their effect as noted above.

Examples of inorganic materials comprising this third grouping are iron grit, iron powder, sand, and kyanite, i.e. aluminum silicate. These materials are hard and coarse and therefore are particularly useful for their frictional characteristics. Barytes, i.e. barium sulfate, rottenstone, i.e. siliceous limestone, and clay also add to the frictional characteristics of the braking element but are particularly useful for their absorptive characteristics. These latter inorganic fillers have proved to be reliable substitutes for asbestos which heretofore provided an absorptive function.

Alumina trihydrate, another inorganic filler, also has been found to be particularly useful as a coolant. At elevated temperatures this material reacts to form water vapor and absorb heat created by the frictional restraint of braking. To effect cooling the amount of aluminum trihydrate in the friction element may be as low as above 5.0 percent by weight.

Note that magnesium oxide and zinc oxide included with the bond materials are also inorganic fillers. In addition to being rubber stiffening and curing agents, these materials also have absorptive qualities. Below in Table III are the various materials which may form in part the inorganic filler grouping and the proximate percentage range by weight within the total composite.

TABLE III

| Inorganic Filler Grouping | |
|---|---|
| Material | Proximate Percentage Range by Weight |
| Iron Grit | — to 33.0% |
| Sand | — to 12.0% |
| Kyanite | 10.0 to 33.0% |
| Barytes | — to 25.0% |
| Rottenstone | — to 14.0% |
| Alumina Trihydrate | — to 25.0% |
| Clay | — to 6.0% |

It should be understood that the use of percentage range by weight as a basis of measurement distorts any actual difference in volume of material used. This distortion is created by the substantial difference in density of the various materials.

The last functional grouping is the structural reinforcing materials. Such materials are dispersed throughout the composite and greatly increase the tensile strength, resistance to shear and other physical characteristics of such. Asbestos is perhaps the best known and widely used natural material in this last functional grouping. Other natural reinforcing materials are wollastonite, i.e. a natural calcium silicate, and mica. Except for mica, these materials are fibrous in nature. Mica has a leaf-like characteristic. Usable manufactured fibers include glass fiber, an aramid polymer fiber under the trade name KEVLAR, steel wool and an alumina-silica ceramic fiber under the trade name FIBERFRAX. These fibers may be combined with asbestos or used as an asbestos substitute. When KEVLAR fiber is used, best results have been obtained by using such in pulp form wherein the fiber ends are open and unraveled.

Below in Table IV are the various materials which may form in part the reinforcing material grouping and the proximate percentage range for each by weight within the total composite.

TABLE IV

| Reinforcing Materials Grouping | |
|---|---|
| Material | Proximate Percentage Range by Weight |
| Asbestos | — to 37.0% |
| Wollastonite | — to 25.0% |
| Mica | — to 17.0% |
| Aramid fiber | — to 5.0% |
| Glass fiber | — to 6.0% |
| Steel wool | — to 15.0% |
| Ceramic fiber | — to 6.0% |

The proximate percentage ranges by weight of the four functional material groupings as combined to form the composite friction element are set forth as follows in Table V.

TABLE V

| Functional Group | Proximate Percentage Range by Weight |
|---|---|
| I Bond | 18.0 to 36.0% |
| II Organic and Carbon Base Fillers | 5.0 to 25.0% |
| III Inorganic Fillers | 25.0 to 65.0% |
| IV Reinforcing Materials | 0.8 to 37.0% |

DESCRIPTION OF THE PREFERRED EMBODIMENT

In the preparation of the composite friction element, various mixing procedures are usable. Examples of such procedures are set forth in considerable detail in U.S. Pat. No. 4,169,840 which is herein incorporated by reference. Commercially available mechanical mixers usable include a sigma blade type, dispersion blade type and a turbulent type. Sigma blade and dispersion blade type mixers are available from Baker-Perkins, Inc., New York, N.Y., while Littleford Bros., Inc., of Florence, Ky., is a supplier of turbulent type mixers.

In a typical mixing procedure, rubber in crumb form is mixed with a solvent to transform the rubber into a media having a paste like consistency. The preferred rubber is an SBR-type available from a number of commercial suppliers. The hard and coarse inorganic fillers can be added during this initial step to aid in this paste formation. Next the reinforcing components, inorganic and carbon base fillers, and remaining inorganic fillers are added and thoroughly dispersed through the media. Lastly, resin and curing agents are added. The preferred resin is a thermosetting phenolic or oil modified type. By use of heat, vacuum and continuous agitation, the solvent is evaporated from the media to produce finite uncured chunks of friction composite, i.e. ranging in size from a few millimeters to five centimeters in diameter.

These uncured chunks of friction composite next are processed through a hammermill to produce a granular consistency having a more uniform partical size. This granular material is then formed into briquettes having the proximate size and shape of the finished composite friction element. Under heat and pressure in a press, a metal backing plate is attached to the briquette. At the same time, the heat and pressure cures the resin and rubber to form a bond in which the various materials are dispersed and permanently fixed.

Below in Tables VI and VII are the percentage weights of the ingredients used in several composite friction elements.

TABLE VI

| Ingredients | Examples | | | | |
|---|---|---|---|---|---|
| | 1 | 2 | 3 | 4 | 5 |
| Rubber | 6.35 | 6.28 | 9.20 | 9.43 | 12.82 |
| Sulfur/Accelerator | 1.21 | 1.90 | 4.80 | 1.66 | 1.18 |
| Uncured Resin | 11.59 | 11.67 | 8.00 | 10.45 | 22.73 |
| Hexa | 0.51 | .41 | 0.30 | 0.37 | 0.80 |
| Carbon Black | — | 0.89 | 0.90 | 1.05 | — |
| Magnesium Oxide | — | 2.09 | 2.00 | 2.19 | — |
| Zinc Oxide | — | 3.55 | 3.50 | 3.81 | — |
| Cured Resin | 3.02 | 3.13 | 3.40 | 3.54 | 5.93 |
| Graphite | 7.56 | 7.39 | — | — | 6.64 |
| Anthracite Coal | 6.75 | — | 4.90 | 5.17 | 9.28 |
| Petroleum Coke | — | 6.42 | — | — | — |
| Neoprene Scrap | 5.04 | — | 4.00 | 4.26 | 7.12 |
| Iron Grit | 21.86 | 24.44 | 23.60 | 18.56 | 6.05 |
| Kyanite | 14.11 | 17.51 | 14.00 | 14.66 | 9.50 |
| Alumina Trihydrate | 13.10 | — | 6.00 | 6.64 | 10.94 |
| Rottenstone | — | — | 2.50 | 3.05 | — |
| Wollastonite | — | 4.48 | 4.30 | 4.96 | — |
| Asbestos | 8.87 | 9.90 | 8.60 | 10.29 | 7.02 |
| | 99.97 | 100.06 | 100.00 | 100.09 | 100.01 |

TABLE VII

| Ingredients | Examples | | | | | | |
|---|---|---|---|---|---|---|---|
| | 6 | 7 | 8 | 9 | 10 | 11 | 12 |
| Rubber | 6.60 | 8.75 | 5.88 | 10.00 | 10.60 | 10.53 | 7.25 |
| Sulfur/Accelerating Agent | 1.70 | 0.46 | 2.00 | 0.35 | 2.00 | 2.10 | 1.45 |
| Uncured Resin | 11.30 | 8.46 | 8.24 | 8.60 | 9.20 | 10.05 | 12.99 |
| Hexa | 0.90 | 0.54 | 0.48 | 0.65 | 0.50 | 0.59 | 0.70 |
| Carbon Black | — | — | — | — | — | — | — |
| Magnesium Oxide | — | — | 2.20 | — | — | — | — |
| Zinc Oxide | 2.40 | — | 4.00 | 6.00 | — | 4.89 | — |
| Cured Resin | 4.50 | 9.79 | 9.48 | 3.90 | — | — | 3.02 |
| Petroleum Coke | 6.50 | — | 6.80 | 6.32 | — | — | — |
| Graphite | — | 8.51 | — | — | 5.80 | — | 5.13 |
| Anthracite Coal | — | — | — | — | 5.20 | 6.39 | 4.93 |
| Neoprene Scrap | — | — | — | — | 10.80 | 3.61 | 5.03 |
| Iron Grit | 25.20 | — | 24.80 | 23.60 | 18.10 | 10.14 | 24.66 |
| Sand | — | 9.55 | — | — | — | — | — |
| Kyanite | 14.40 | 16.96 | 14.64 | 14.00 | 11.90 | 15.26 | 17.31 |
| Alumina Trihydrate | 5.60 | 12.46 | — | 10.00 | 10.90 | 12.26 | 15.10 |
| Barytes | 9.80 | 11.52 | 7.00 | 8.78 | — | 6.87 | — |
| Rottenstone | 8.70 | — | — | 7.00 | — | 5.78 | — |
| Aluminum Oxide | 0.50 | — | 0.40 | — | — | — | — |
| Wollastonite | — | 11.77 | — | — | — | — | — |
| KEVLAR | 1.90 | 1.09 | 0.80 | 0.80 | — | 2.00 | 2.42 |
| Mica | — | — | 13.28 | — | — | — | — |
| Steel Wool | — | — | — | — | 15.00 | 9.53 | — |

TABLE VII-continued

| Ingredients | Examples | | | | | | |
|---|---|---|---|---|---|---|---|
| | 6 | 7 | 8 | 9 | 10 | 11 | 12 |
| Ferrocene | — | 0.20 | — | — | — | — | — |
| | 100.00 | 100.06 | 100.00 | 100.00 | 100.00 | 100.00 | 99.99 |

Railroad brake shoes were made having a composite friction element comprising the ingredients noted in the twelve (12) examples. In each case, satisfactory results were obtained under the drag, stops and coefficient of friction test procedures prescribed by the Association of American Railroads.

While various modifications may be suggested by those versed in the art, it should be understood that I wish to embody within the scope of the patent warranted hereon, all such modifications as reasonably and properly come within the scope of my contribution to the art.

What is claimed is:

1. A composite friction element for a railroad brake shoe and the like, said element having a bond of synthetic rubber selected from the group consisting of a butyl rubber, a styrene butadiene copolymer rubber, an acrylonitrile rubber, and a chlorinated butyl rubber, said rubber blended with a phenolic thermosetting resin, organic and carbon base fillers, reinforcing materials, and inorganic fillers, an improvement in said element comprising said inorganic fillers being present in said element in a percentage range by weight of about 25.0% to 65.0% and consisting in part of alumina trihydrate being present in said element in a percentage range by weight of about 5.0% to 25.0%.

2. A composite friction element as defined by claim 1 and further characterized by,
    said bond being present in said element in a range by weight of about 18.0% to 36.0%,
    said organic and carbon base fillers consisting in part of a cured resin being present in said element in a range by weight of about 3.0% to 10.0%, and
    said organic and carbon base fillers being present in said element in a range by weight of about 10.0% to 25.0%.

3. A composite friction element as defined by claim 2 and further characterized by,
    the remainder of said organic and carbon base fillers being selected from the group consisting of neoprene scrap, petroleum coke and graphite, and
    the remainder of said inorganic fillers being selected from a group consisting of iron grit and kyanite.

* * * * *